US 8,157,074 B2
(12) United States Patent
Harada

(10) Patent No.: US 8,157,074 B2
(45) Date of Patent: Apr. 17, 2012

(54) CENTRIFUGAL CLUTCH

(75) Inventor: Atsushi Harada, Kawagoe (JP)

(73) Assignee: Husqvarna Zenoah Co., Ltd., Kawagoe-Shi (JP)

( * ) Notice: Subject to any disclaimer, the term of this patent is extended or adjusted under 35 U.S.C. 154(b) by 748 days.

(21) Appl. No.: 12/225,627

(22) PCT Filed: Mar. 27, 2007

(86) PCT No.: PCT/JP2007/056403
§ 371 (c)(1),
(2), (4) Date: Sep. 26, 2008

(87) PCT Pub. No.: WO2007/116738
PCT Pub. Date: Oct. 18, 2007

(65) Prior Publication Data
US 2009/0250306 A1     Oct. 8, 2009

(30) Foreign Application Priority Data
Mar. 31, 2006   (JP) ................................ 2006-097559

(51) Int. Cl.
*F16D 43/18* (2006.01)
(52) U.S. Cl. ............................ 192/105 CD; 192/103 B
(58) Field of Classification Search ............ 192/105 CD, 192/103 B
See application file for complete search history.

(56) References Cited

U.S. PATENT DOCUMENTS

| 3,208,571 A | * | 9/1965 | Bochory ................. 192/105 CD |
| 4,192,412 A |   | 3/1980 | Stoner |
| 4,226,320 A | * | 10/1980 | St. John ................. 192/105 CD |
| 4,254,854 A |   | 3/1981 | St. John |
| 4,294,342 A | * | 10/1981 | St. John ................. 192/105 CD |
| 4,635,777 A |   | 1/1987 | Nickel et al. |
| 4,976,065 A | * | 12/1990 | Beran et al. ................ 49/43 |
| 5,577,587 A |   | 11/1996 | Jansson |
| 6,000,519 A | * | 12/1999 | Becker et al. ........ 192/105 CD |
| 6,478,129 B2 | * | 11/2002 | Lambertini ............ 192/105 CD |
| 6,502,315 B2 | * | 1/2003 | Menzel et al. .................. 30/381 |
| 7,111,715 B2 | * | 9/2006 | Omata et al. ..................... 192/16 |
| 7,128,194 B2 | * | 10/2006 | Ishizaka et al. ........ 192/105 CD |

(Continued)

FOREIGN PATENT DOCUMENTS

| DE | 1 083 606 B | 6/1960 |
| EP | 1378678 A1 | 7/2004 |
| JP | 56-48993 Y2 | 11/1981 |
| JP | 58-146134 U | 10/1983 |
| JP | 60-234133 A | 11/1985 |

(Continued)

OTHER PUBLICATIONS

International Preliminary Report on Patentability issued in Application Serial No. PCT/JP2007/056403 dated Oct. 21, 2008.
Written Opinion of the International Searching Authority issued in Application Serial No. PCT/JP2007/056403 dated Oct. 21, 2008.

(Continued)

*Primary Examiner* — David D Le
*Assistant Examiner* — Jude Agendia
(74) *Attorney, Agent, or Firm* — Holtz, Holtz, Goodman & Chick, PC

(57) ABSTRACT

In a pendulum centrifugal clutch, a shoe is provided in a manner rotatable about a boss, and a fitting hole that rotatably fits with the boss is provided to the shoe. The fitting hole is bored on a thin portion formed by reducing a thickness of a shoe body from first and second sides of the shoe body. The thin portion is interposed between a brim provided to a first axial end of the boss and a plate brought adjacent to a second axial end of the boss.

2 Claims, 4 Drawing Sheets

U.S. PATENT DOCUMENTS

| | | | |
|---|---|---|---|
| 7,600,625 B2 * | 10/2009 | Ishikawa et al. | 192/105 CD |
| 7,849,987 B2 * | 12/2010 | Kaskawitz et al. | 192/14 |
| 2004/0055851 A1 | 3/2004 | Ishizaka et al. | |
| 2008/0060903 A1 * | 3/2008 | Lian et al. | 192/105 CD |

FOREIGN PATENT DOCUMENTS

| | | |
|---|---|---|
| JP | 07-190100 A | 7/1995 |
| JP | 10-331874 A | 12/1998 |
| JP | 2004-36806 A | 2/2004 |

OTHER PUBLICATIONS

Chinese Office Action dated May 20, 2010 and English translation thereof in counterpart Chinese Application No. 2007-80011037.2.

IDS Form filed Sep. 26, 2008 showing a correction to the third-listed U.S. patent document in handwriting.

Extended European Search Report (EESR) dated Jun. 10, 2011 (in English) in counterpart European Application No. 07739841.0.

\* cited by examiner

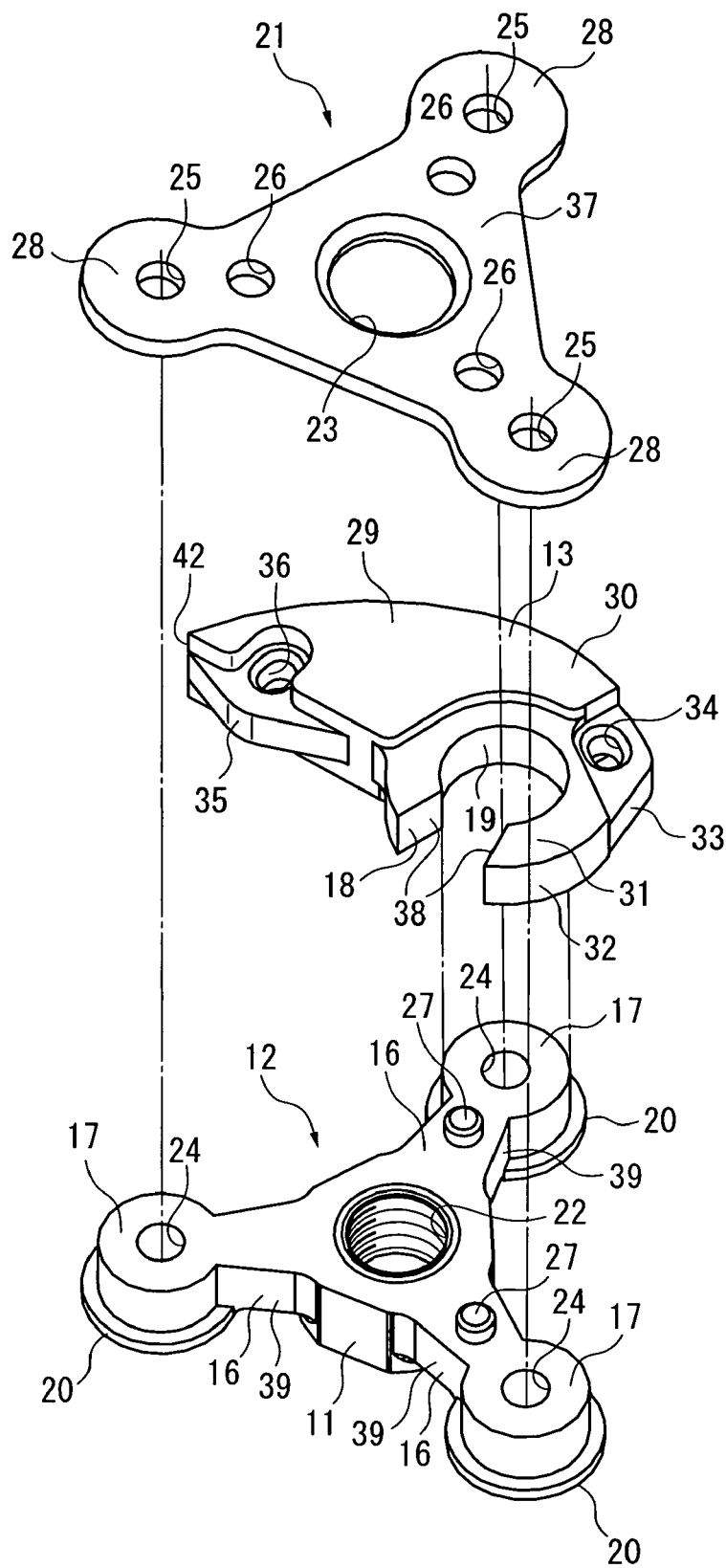

CENTRIFUGAL CLUTCH

This application is a U.S. National Phase Application under 35 USC 371 of International Application PCT/JP2007/056403 filed March 27, 2007.

TECHNICAL FIELD

The present invention relates to a centrifugal clutch applied to a power transmitting portion of a portable work machine.

BACKGROUND ART

Conventionally, an engine of a small displacement is often employed as a power source of a portable work machine such as a chainsaw. Power from such an engine is transmitted via a centrifugal clutch to a sprocket around which a saw chain is wounded. Among a variety of centrifugal clutches that have been developed, a pendulum centrifugal clutch including: a hub fixed to an output shaft of the engine; a pair of arms integrally provided to the hub; a boss provided to a distal end of the arm; and a shoe rotatably fitted to the boss is known as a centrifugal clutch applied to a portable work machine, of which downsizing and weight reduction are desired (e.g., Patent Document 1).

The centrifugal clutch disclosed in Patent Document 1 does not employ conventional locking means such as an E ring to prevent the shoe from disengaging from the boss. Instead, the centrifugal clutch employs a projection integrally provided to the boss, thereby omitting separate members such as locking means and decreasing the number of means.

Patent Document 1: JP-A-07-190100

DISCLOSURE OF THE INVENTION

Problems to be Solved by the Invention

As in a centrifugal clutch disclosed in Patent Document 1, when a projection is integrally provided to a boss to prevent a shoe from disengaging from the boss in a first direction, and no other locking means is provided, a disengagement preventing section that prevents the shoe from disengaging in a second direction is required to be provided to the shoe. However, providing such a disengagement preventing section to the shoe increase the thickness of shoe, thereby hindering thickness reduction and weight reduction of the centrifugal clutch.

In addition, because the disengagement preventing section is disposed at a fitting portion at which the shoe fits with the boss, the shoe is thick at the fitting portion. Accordingly, the center of gravity of the shoe resides close to the rotational center, so that rotation of the shoe by centrifugal force is not conducted in a favorably responding manner. This is particularly a crucial problem for a compact centrifugal clutch for a portable work machine.

An object of the invention is to provide a pendulum centrifugal clutch which promotes thickness reduction and with which favorable rotational response of a shoe is obtained.

Means for Solving the Problems

A centrifugal clutch according to an aspect of the invention is a centrifugal clutch of pendulum type in which a shoe is provided in a manner rotatable about a boss, the centrifugal clutch including a fitting hole that rotatably fits with the boss and is provided to the shoe, in which the fitting hole is bored on a thin portion that is formed by reducing a thickness of a shoe body from first and second sides of the shoe body, and the thin portion is interposed between a brim provided to a first axial end of the boss and a plate brought adjacent to a second axial end of the boss.

With the aspect of the invention, the thin portion of the shoe is interposed between the brim provided to the boss and the plate, and the brim and the plate are superposed on the thin portion. Accordingly, an increase in the thickness of the fitting arrangement is prevented, thereby allowing thickness reduction of the centrifugal clutch. In addition, because the thickness is reduced at the portion of the shoe adjacent to the rotational center, the gravitational center of the shoe resides forward in a rotational direction of the shoe. Accordingly, the shoe can be rotated by centrifugal force and restored from the rotated state with a favorable response.

In the above arrangement of the centrifugal clutch, it is preferable that the thin portion is provided with a notch that communicates with the fitting hole, the boss is provided to a distal end of an arm extending from a hub attached to an output shaft, the shoe is fitted with the boss in a manner that the arm lies within the notch, and a range of rotation of the shoe is restricted by the arm and a pair of notch faces that are formed on the notch and abut to the arm.

With the above arrangement, because the notch face formed on the notch of the shoe abuts to the arm, a range of the rotation of the shoe is reliably restricted. In addition, when no centrifugal force is applied to the shoe, springs or the like that connect the shoes apply biasing force to the shoes to cause the shoe to abut to the notch face. Therefore, rattling of the shoe can be reliably eliminated.

In the above arrangement of the centrifugal clutch, it is preferable that the plate protrudes from the arm by a predetermined width in a manner following a contour of the arm and a clearance formed between one of the pair of notch faces and the arm is smaller than a protruding portion of the plate.

With the above arrangement, because the size of the clearance formed between the notch face and the arm is larger than the protruding portion of the plate, the plate and the notch are prevented from hooking each other. Therefore, the shoe can rotate smoothly. In addition, because the plate is only required to protrude by a predetermined dimension in a manner following the contour of the arm, extra portion can be omitted. Therefore, weight of the plate can be reduced, and thus weight of the entire centrifugal clutch can also be reduced.

BRIEF DESCRIPTION OF DRAWINGS

FIG. 4 is an exploded perspective view showing the primary portion of the centrifugal clutch.

Explanation of Codes

BEST MODE FOR CARRYING OUT THE INVENTION

An embodiment of the invention will be described with reference to the drawings below.

Figure 1:
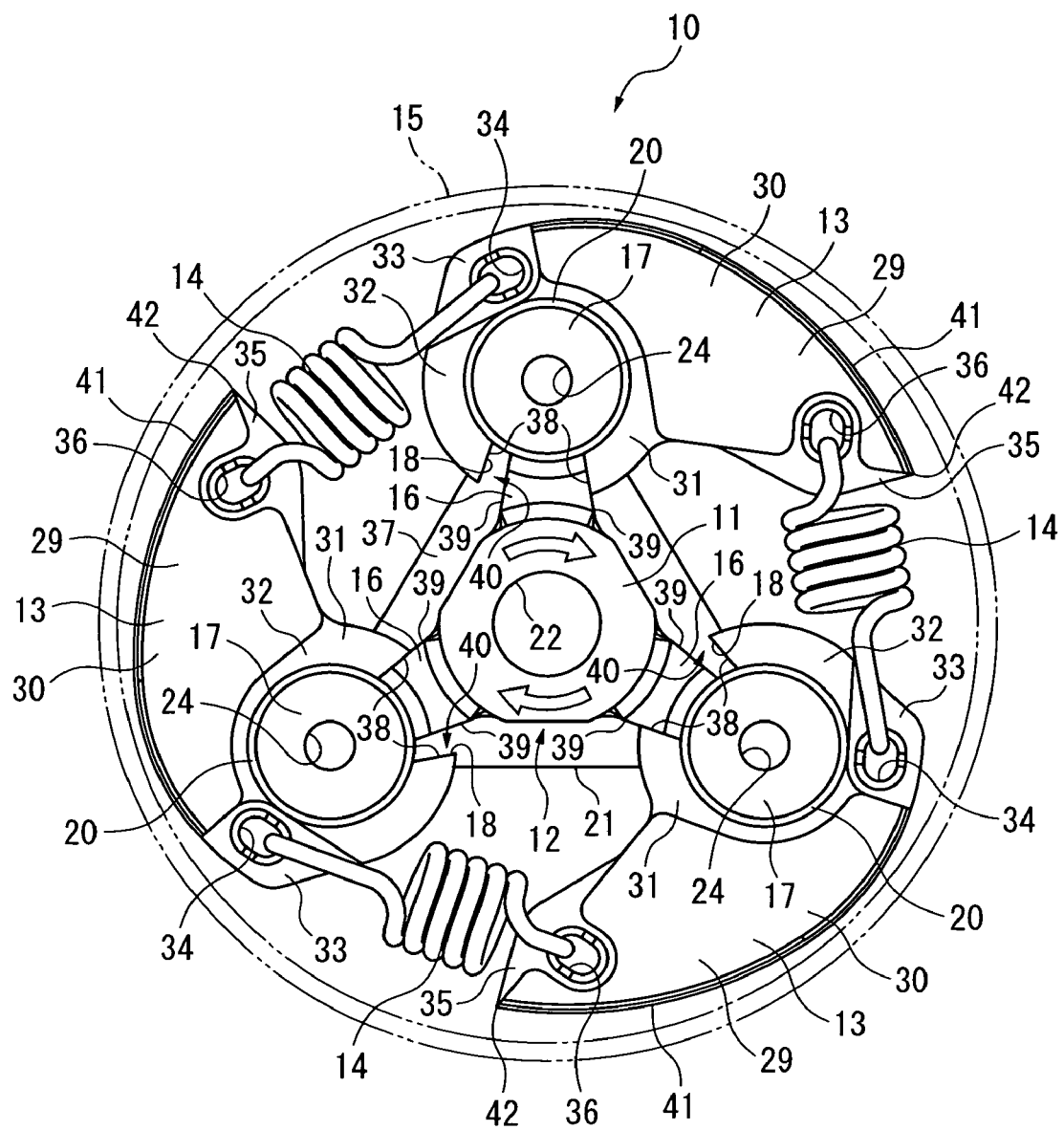
FIG. 1 is a front view showing a centrifugal clutch according to an embodiment of the invention.
Figure 2:
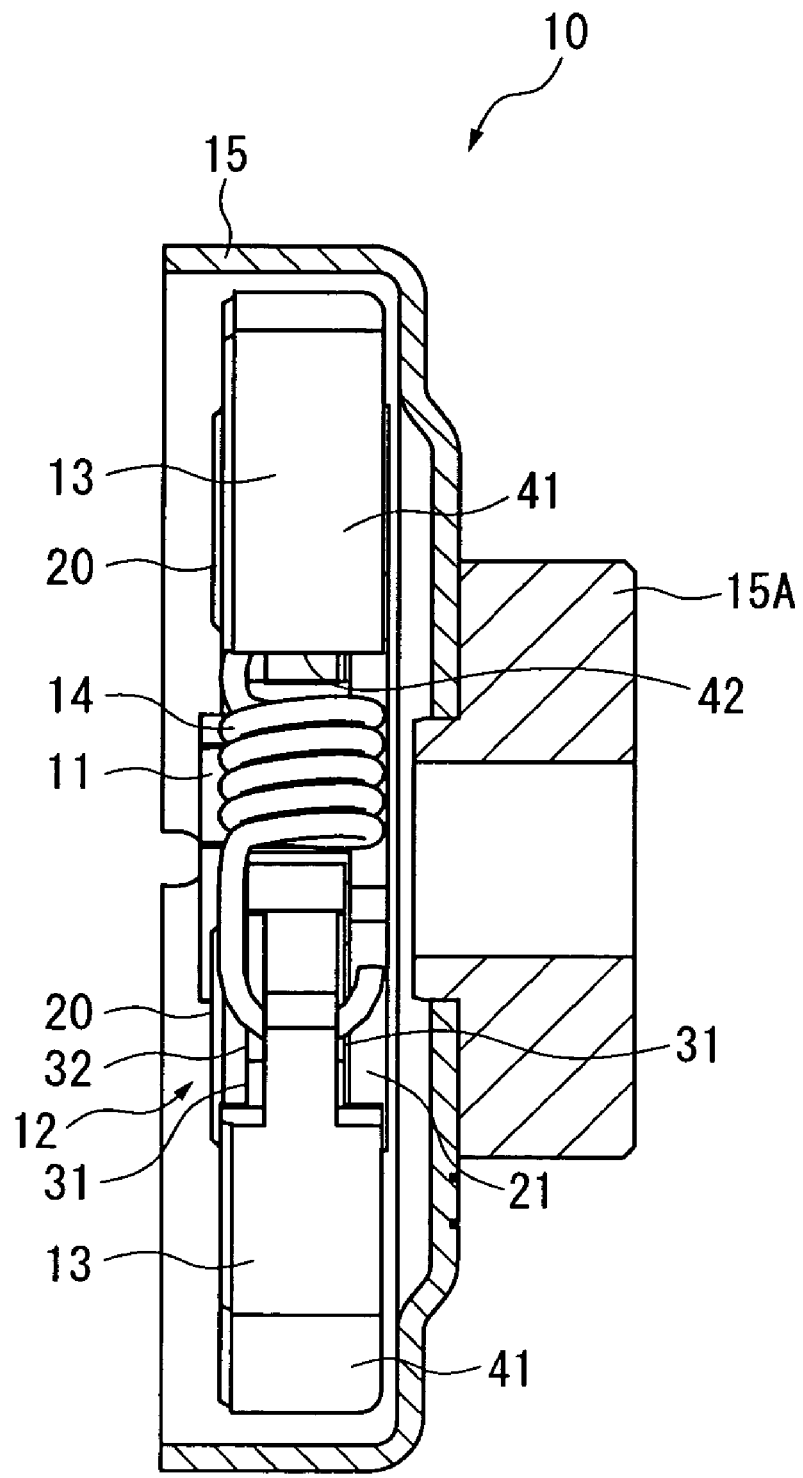
FIG. 2 is a lateral view of the centrifugal clutch in which the centrifugal clutch is partially shown in cross sectional view.
Figure 3:
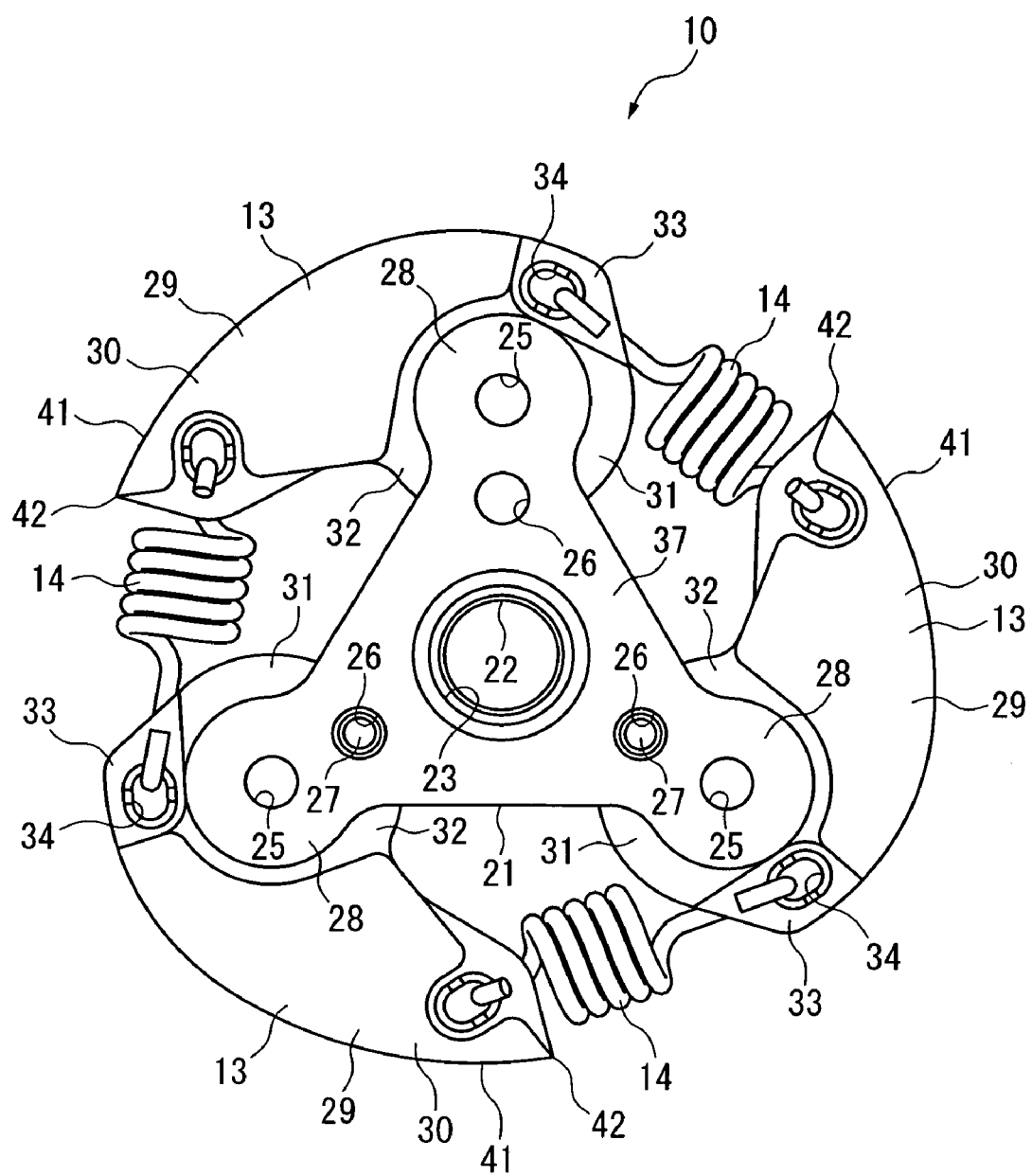
FIG. 3 is a rear view showing a rear side of a primary portion of the centrifugal clutch.

FIG. 1 is a front view showing the centrifugal clutch 10 according to the embodiment. FIG. 2 is a lateral view of the centrifugal clutch 10 in which the centrifugal clutch 10 is partially shown in cross-sectional view. FIG. 3 is a rear view showing a rear side of a primary portion of the centrifugal clutch 10. FIG. 4 is an exploded perspective view of the primary portion of the centrifugal clutch 10.

The centrifugal clutch 10, which is exemplarily configured as a pendulum centrifugal clutch, includes: a drive section 12 having a hub 11 screwed to an end of a crankshaft (output shaft) or the like of an engine (not shown); three shoes 13 rotatably supported to the drive section 12; coil springs 14 that connects a neighboring set of the shoes 13, which are circumferentially disposed; and a clutch drum 15 that rotates by being contacted by the shoes 13. Incidentally, the centrifugal clutch 10 of the embodiment is for a chainsaw, and the clutch drum 15 (i.e., the driven member) is integrally provided with a sprocket 15A around which a saw chain is wound.

A three face portion for screwing and unscrewing the hub 11 with a tool is provided to the hub 11 of the drive section 12, and three arms 16 circumferentially and equidistantly disposed extend radially outward from the hub 11. A boss 17 shaped in a cylinder having a central axis parallel to the rotational central axis is provided to a distal end of each of the arms 16. The shoe 13 is rotatably fitted with the boss 17.

An end of the shoe 13 is provided with a notch 18 shaped in an outwardly widening fashion and a fitting hole 19 communicating with the notch 18. The boss 17 fits in the fitting hole 19 with the arm 16 lying within the notch 18. Here, a brim 20 having a larger diameter than the boss 17 is circumferentially and continuously provided to a first axial end of the boss 17. The shoe 13 is locked by the brim 20 to be blocked from disengaging from the boss 17 in the first-end direction.

Adjacent to a side of the boss 17 opposite to the side of the boss 17 that includes the brim 20, a retainer plate 21 is provided for covering the hub 11, the arms 16 and the bosses 17. A penetrating hole 23 that corresponds to a shaft screw hole 22 of the hub 11, a circular hole 25 that corresponds to a weight-reducing center hole 24 of the boss 17, a dowel hole 26 positioned in correspondence with each of the arms 16 are bored on the plate 21.

After the three shoes 13 are fitted with the bosses 17, attachment of the plate 21 to the drive section 12 is conducted in the same direction as the fitting direction of the shoes 13. Two of the three arms 16 are each provided with a pillar-shaped dowel 27. The plate 21 is positioned relative to and attached to the drive section 12 by inserting the dowels 27 in the aforementioned dowel holes 26. The three dowel holes 26 are bored on the plate 21 so as not to limit the attaching orientation of the plate 21. Assembling efficiency can thus be improved.

Three vertexes of the plate 21 each have a retainer 28 substantially having the same size as the brim 20. The retainer 28 blocks the shoe 13 from disengaging in a second-end direction, the second end being the second axial end of the boss 17. With this arrangement, the shoe 13 rotates in a manner interposed between the brim 20 and the retainer 28.

Here, a countersink 31 lowered from (i.e., formed thinner than) an outer surface 30 of a shoe body 29 is provided around the fitting hole 19 on both sides of the shoe 13. A portion at which the countersinks 31 are provided to both sides forms a thin portion 32 inwardly stepped from both sides of the shoe body 29. Depths of the countersinks 31 (i.e., height dimensions of the steps) on both sides are substantially the same as each other and substantially the same as thickness dimensions of the brim 20 and the retainer 28.

With this arrangement, the brim 20 and the retainer 28 are superposed on the thin portion 32. Thus, the brim 20 and the retainer 28 do not greatly project in the thickness direction of the shoe 13, so that the thickness of the centrifugal clutch 10 can be reduced. In addition, because the thickness of the shoe 13 is reduced at the portion adjacent to the rotational center, the gravitational center of the shoe 13 resides forward in a rotating direction of the shoe 13 (see, blank arrow in FIG. 1). Accordingly, the shoe 13 can be rotated by centrifugal force and restored from the rotated state with a favorable response.

Moreover, an even thinner coil engaging portion 33 is formed in the vicinity of the thin portion 32 of the shoe 13. A first end of one coil spring 14 is engaged with an engaging hole 34 bored in the coil engaging portion 33. A coil engaging portion 35 substantially having the same thickness as the coil engaging portion 33 is formed at a second end opposite to the thin portion 32. A second end of another coil spring 14 is engaged to the engaging hole 36 of the coil engaging portion 35. Incidentally, to adapt for attachment to the neighboring shoes 13, an attaching portion of the first end of the coil spring 14 is longer than the attaching portion of the second end of the coil spring 14.

As shown in FIG. 1, when the plate 21 is attached to the drive section 12, a substantially triangular planar portion 37 of the plate 21 does not coincide with but protrudes from the drive section 12. Specifically, an outer circumference of the planar portion 37 protrudes by a predetermined size in a manner following the contour of the arm 16. Furthermore, in the notch 18 provided to the shoe 13, a pair of notch faces 38 abut to lateral sides 39 of the arm 16 to limit a rotational angle of the shoe 13.

When centrifugal force is not applied to the shoe 13, a first one of the pair of notch faces 38 abuts to a first one of the lateral sides 39 of the arm 16 by a biasing force of the coil spring 14. At this time, a clearance 40 is formed between a second one of the pair of notch faces 38 and a second one of the lateral sides 39. The maximum size of the clearance 40 is smaller than the size of the protruding portion of the planar portion 37.

When centrifugal force is applied to the shoe 13, the shoe 13 rotates against biasing force in a direction such that the clearance 40 is reduced. In contrast to the above, a clearance is formed between the first one of the pair of notch faces 38 and the first one of the lateral sides 39. The size of clearance formed here does not greatly surpass the size of the protruding portion of the planar portion 37, either.

In other words, the clearance 40 formed in accordance with the rotation of the shoe 13 stays within a region of the planar portion 37, so that a peripheral edge of the planar portion 37 and a peripheral edge of the notch face 38 do not hook each other, thereby allowing a smooth rotation of the shoe 13.

In addition, a substantially half portion of an outer lateral side of the shoe 13, i.e., a portion of the lateral side extending from the center of the lateral side to the rotation-wise forward end of the lateral side, forms a contact surface 41 substantially having the same radius of curvature as the inner circumference of the clutch drum 15. When the shoe 13 outwardly rotates by centrifugal force, the shoe 13 contacts the inner circumference of the clutch drum 15 at such a wise contact area as to substantially correspond to the entire contact surface 41.

At a rotation-wise forward end of the shoe 13, a periphery of the contact surface 41 forms an edge 42. The edge 42 is not an edge rounded with a chamfer or the like but a sharp edge. Accordingly, when the contact surface 41 contacts the inner circumference of the clutch drum 15 by the rotation of the shoe 13, the edge 42 abuts to the inner circumference in a thrusting manner. In other words, the edge 42 abuts to the inner circumference as if the edge is a wedge. As a result, drive is efficiently transmitted to the clutch drum 15 from the drive section 12.

The scope of the invention is not limited to the above embodiment, but includes other arrangements and the like as long as an object of the invention is achieved. The following modifications are also included in the scope of the invention.

For example, other than the sharp edge 42 in the above embodiment, the rotation-wise forward end of the shoe 13 may include a rounded portion for smooth operation of the clutch.

The number of the arms 16 is three in the above embodiment, but may be two or four. The number of the arms 16 may be suitably determined upon implementation. However, the three arms 16 are preferred as compared to the two arms 16, for example. With such an arrangement, load applied to each of the shoes 13 can be reduced, thereby improving durability.

The best arrangement, method and the like for implementing the invention has been disclosed above, but the scope of the invention is not limited thereto. The invention is illustrated and described mainly regarding a specified embodiment, but those skilled in the art can modify the above embodiment with respect to shapes, quantities and other details without departing from the scope of a technical idea and an object of the invention.

Therefore, any of the description for limiting the shapes, quantities and the like is exemplarily made to facilitate understanding of the invention and does not limit the scope of the invention. Thus, a component named without a part of or all of the limitations limiting shapes, quantities and the like is included in the scope of the invention.

The invention claimed is:

1. A centrifugal clutch comprising:
a shoe that is provided to be rotatable about a boss;
wherein the shoe comprises:
    a thin portion formed by reducing a thickness of a body of the shoe from first and second sides of the body;
    a fitting hole that is provided in the thin portion and rotatably fits with the boss; and
    a notch that is provided in the thin portion and communicates with the fitting hole, wherein the notch has a pair of notch faces on opposite sides thereof;
wherein the thin portion of the shoe is interposed between a brim provided to a first axial end of the boss and a plate adjacent to a second axial end of the boss;
wherein the boss is provided to a distal end of an arm that extends from a hub, the hub being configured to be attached to an output shaft;
wherein the boss and the shoe are coupled in such a manner that the arm lies within the notch in the shoe; and
wherein a range of rotation of the shoe is restricted by interaction of the arm and the notch faces of the notch, which are configured to abut the arm.

2. The centrifugal clutch according to claim 1, wherein the plate protrudes from the arm by a predetermined width in a manner following a contour of the arm, and a clearance formed between one of the pair of notch faces and the arm is smaller than a protruding portion of the plate.

* * * * *